E. KORTING.
Improvement in Utilizing the Exhaust Steam of Engines.
No. 125,056. Patented March 26, 1872.
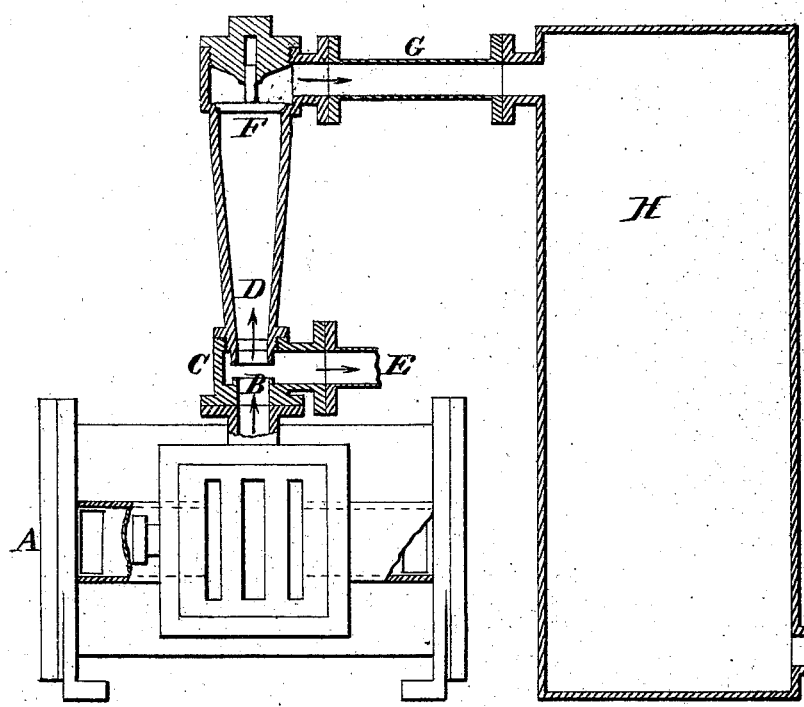
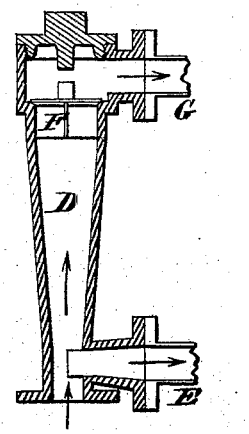
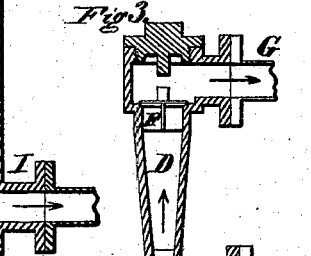
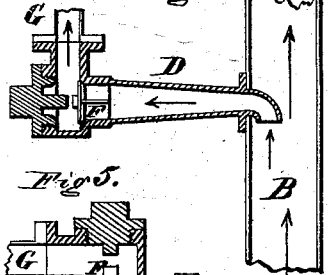
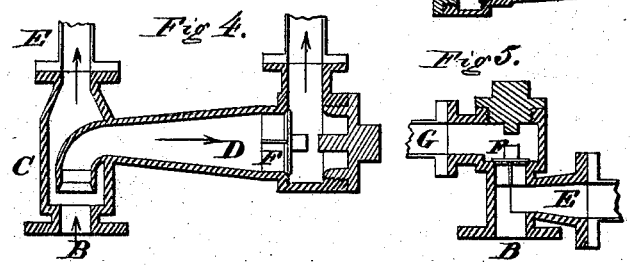
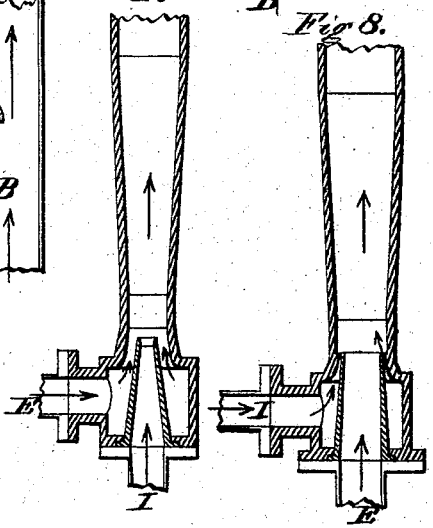
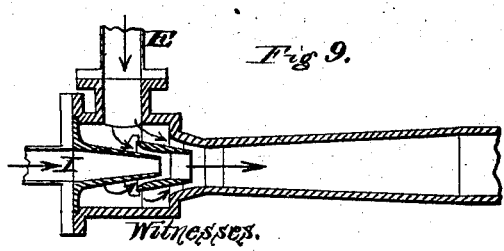
Witnesses.
Harry King.
Phil. S. Dodge
Inventor.
Ernst Korting.
by Dodge & Munn
Attys.

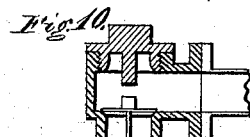
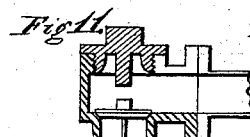
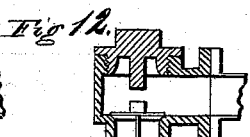
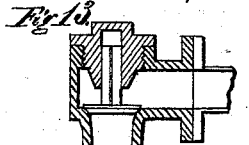
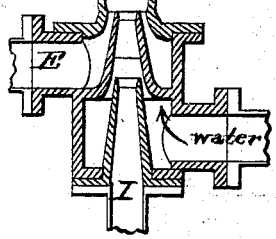
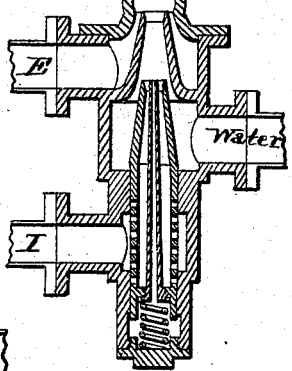
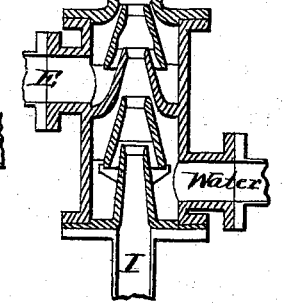
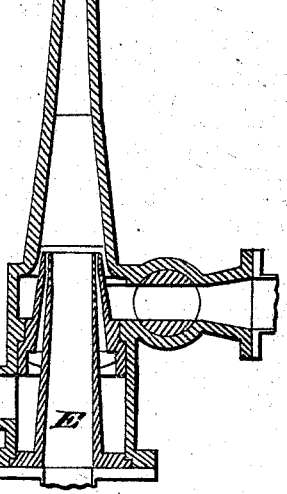
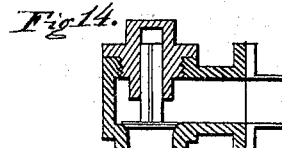
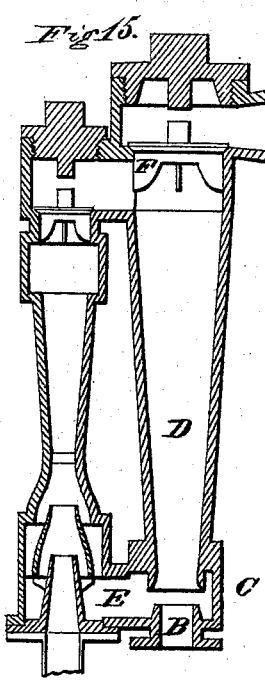
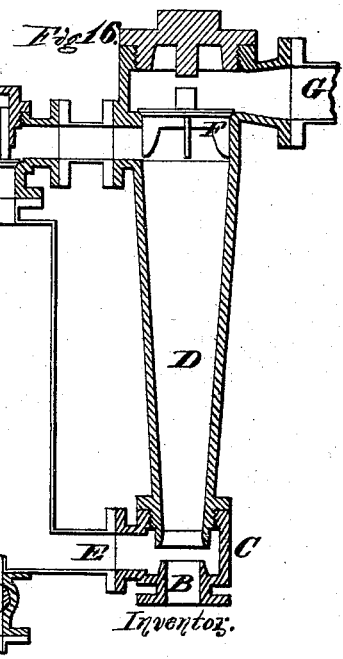

125,056

UNITED STATES PATENT OFFICE.

ERNST KÖRTING, OF BERLIN, PRUSSIA.

IMPROVEMENT IN UTILIZING THE EXHAUST STEAM OF ENGINES.

Specification forming part of Letters Patent No. 125,056, dated March 26, 1872.

SPECIFICATION.

*To all whom it may concern:*

Be it known that I, ERNST KÖRTING, of Berlin, Kingdom of Prussia, have invented certain Improvements in Utilizing the Exhaust Steam of Steam-Engines, &c., of which the following is a specification, reference being had to the accompanying drawing.

My invention consists in a novel construction and application of an apparatus for dividing, confining, and utilizing the exhaust steam of steam-engines.

Figure 1 is a sectional view of my apparatus applied to the cylinder of an ordinary engine. Figs. 2, 3, 4, 5, and 6 are sectional views of modified forms of the apparatus for dividing the steam and conveying the live portion to the receiver or store-vessel. Figs. 7, 8, and 9 are views of vacuum or exhaust producers, which may be operated by the steam after being confined by my apparatus. Figs. 10 to 16, inclusive, are views of condensers to be operated by the exhaust steam.

Referring to Fig. 1 of the drawing, A represents the cylinder of the engine; B, a short vertical pipe connected to the exhaust-port of the engine to carry off the steam; D, a tapering pipe, having its small end arranged opposite to the end of pipe B; C, a body or chamber inclosing the adjacent ends of the two pipes B D; and E, a pipe leading from the side of chamber C, and discharging either into the open air or into a condenser. The adjacent ends of the two pipes are made of the same diameter, and a space left between them large enough to let the entire body of steam flow out into the chamber C, so as to prevent any back pressure on the piston of the engine. F is a check-valve, mounted in the upper end of the tapering pipe D, and arranged to open outward; and G is a pipe leading from the space above the valve to the receiver or store-vessel H, which is provided with a discharge-pipe, I.

When the exhaust-port of the engine is opened the steam, filling the cylinder at a certain pressure, is suddenly put in communication with the open air or condenser by means of the pipes B and E, and consequently blows, with a velocity corresponding to the pressure, out through the pipe B and into the opposite mouth of the tapering pipe D, which is thus filled with steam at a pressure nearly equal to that in the cylinder at the end of the stroke. The steam in the pipe D raises the check-valve F and flows through the pipe G into the receiver H. Very soon, however, the pressure of the steam issuing from the cylinder will decrease, so that it will not have sufficient force to raise the check-valve against the counter-pressure from the receiver, whereupon the valve will close, and the remainder of the exhaust steam will flow out into the chamber C, and thence, through the pipe E, into the open air or the condenser. Thus, at each stroke of the engine, the live portion of the exhaust steam is carried, under nearly its original pressure, into the receiver, which is thus kept full of the live steam, while the dead portion is separated and carried off through the pipe E.

The steam thus saved and stored up may be used for driving machinery, operating injectors, condensers, or vacuum apparatus, or for heating purposes; in short, for any of the purposes for which steam fresh from the boiler may be used.

The apparatus may be varied in its arrangement as experience may suggest or circumstances require, a few of these variations or modifications being represented in Figs. 2, 3, 4, 5, and 6. In the arrangement shown in Fig. 2 the chamber C is dispensed with, the tapering pipe D attached directly to the discharge-pipe B of the cylinder, and the overflow or waste pipe F connected to the lower end of the pipe D. The arrangement shown in Fig. 3 is the same as that in Fig. 2, except that the pipe D has its mouth or throat contracted in size just above the waste-pipe F, this apparatus being designed to save a comparatively small portion of the steam. Fig. 4 represents an arrangement in which the waste or overflow pipe is connected to the chamber C in line with the pipe B, and the course of the issuing steam, and the tapering pipe D arranged at right angles thereto, with its small end or mouth inserted through the side of the chamber C, and bent around so as to receive the steam from the mouth of pipe B. In the arrangement represented in Fig. 5 the long tapering pipe D is dispensed with, and the pipes E and G attached to a short neck or continuation of the pipe B, the check-valve being mounted in the neck just above the mouth of the pipe E. This arrangement answers only when the steam is to be confined under a small pressure. In the form shown in Fig. 6 the waste-pipe E is attached directly to the exhaust-pipe B of the cylinder, and the conical pipe D has its end inserted through the side of the waste-pipe and bent around so as to face the current of steam. The mouth of the tapering-pipe is, however, made quite small, as it is intended to receive but a small portion of the steam.

The following are a few of the many methods in which the steam, after being stored in the receiver, may be utilized: It may, by means of a special cylinder and piston, be applied for working the air-pumps of an ordinary condensing-engine, in which case the overflow-pipe E will be connected with the condenser so as to carry the dead steam thereto. When water for condensing purposes is scarce a portion of the exhaust steam may be discharged into the open air and the balance only taken to the condenser through the pipe E, thus saving water, and at the same time obtaining the usual vacuum in the condenser and the full engine-power. It may be discharged into the chimney of the steam-boiler or of other furnaces to increase the draught. The continual blast thus produced is much better and more advantageous than the intermittent blast produced by discharging the exhaust steam directly into the chimney at each stroke of the engine, in the usual manner. It may be applied, either alone or in connection with a jet of live steam from the boiler, to operate the feed-water injector of the boiler. It may also be applied to work a vacuum apparatus to produce a vacuum in the cylinders of steam-engines, different forms of such apparatus being represented in Figs. 7, 8, and 9.

Fig. 7 represents a form in which the steam-jet blows into the mouth of a pipe, causing an inward suction around the steam-pipe or nozzle. Figs. 8 and 9 represent forms in which the steam surrounds and blows past the mouth of a pipe, causing an inward suction through the same.

The steam from the receiver may be applied to produce a vacuum or partial vacuum in the cylinder of a steam-engine by working a jet-condenser, different forms of which are shown in Figs. 10, 11, 12, 13, and 14. In such cases the condensers are so applied as to condense the overflow or waste-steam issuing through pipe E, thereby producing a vacuum in the pipe and the cylinder.

Fig. 15 shows an ordinary condenser; and Fig. 16, a jet-condenser, with the method of operating them by the steam from the dividing or separating apparatus without the receiver.

It is obvious that my apparatus is applicable not only to engines, but to all kinds of machinery operated by steam in which the steam is discharged after being used.

Having thus described my method of and apparatus for separating the live and the dead portions of the exhaust steam, and of confining the former, and having also described various methods of utilizing them both, what I claim as my invention is—

1. The herein-described method of utilizing the exhaust steam of steam-engines by exhausting the same into a reservoir, H, provided with a check-valve, F, arranged to operate as described, whereby the exhaust steam is retained in the reservoir and the back pressure on the engine prevented, thus enabling the exhaust steam to be used for other purposes, as set forth.

2. In combination with the exhaust-port of an engine, the pipes E and D, check-valve F, and receiver or store-vessel H, when arranged to operate substantially as described.

3. In combination with the exhaust-port of an engine, the pipes E and G and check-valve F, used either with or without the tapering pipe D, as described.

ERNST KÖRTING.

Witnesses:
R. DRESSEL,
ISIDOR ROSENSTERN.